United States Patent [19]

Tsuda

[11] 4,093,377
[45] June 6, 1978

[54] COPYING MACHINE

[75] Inventor: Hiroshi Tsuda, Mitaka, Japan

[73] Assignee: Olympus Optical Company Limited, Tokyo, Japan

[21] Appl. No.: 749,262

[22] Filed: Dec. 10, 1976

[30] Foreign Application Priority Data

Dec. 16, 1975 Japan .......................... 50-168907[U]

[51] Int. Cl.² ...................... G03B 27/62; G03B 27/64
[52] U.S. Cl. ........................................ 355/76; 355/116
[58] Field of Search ................ 355/73, 75, 76, 93, 355/87, 116

[56] References Cited

U.S. PATENT DOCUMENTS 2,741,154   4/1956   Ludwig ................................ 355/76
3,207,030   9/1965   Polland .............................. 355/76 X Primary Examiner—Richard A. Wintercorn
Attorney, Agent, or Firm—Haseltine, Lake & Waters

[57] ABSTRACT

A copying machine for preparing copies of a manuscript to be reproduced disposed on a carriage movably mounted on a casing is disclosed. The machine comprises at least one manuscript holding member resiliently connected to a lid covering the manuscript and projecting above the manuscript. The manuscript holding member is urged against the manuscript until the lid reaches to its given open position and separated from the manuscript when the lid is further opened beyond the above mentioned given open position of the lid.

3 Claims, 5 Drawing Figures

COPYING MACHINE

BACKGROUND OF THE INVENTION

This invention relates to a copying machine for preparing copies of a manuscript to be reproduced disposed on a carriage movably mounted on a casing.

In such kind of copying machines, the manuscript disposed on the carriage is covered and fixed when copies of the manuscript are prepared by a lid secured to a pivot shaft which is rotatably mounted on the carriage.

In the case of removing copies thus prepared out of the machine, if the lid is opened, there is a risk of the manuscript formed particularly of a thin paper being adhered to the lid and flied off in different directions.

SUMMARY OF THE INVENTION

An object of the invention, therefore, is to provide a copying machine which can obviate the above mentioned disadvantage which has been encountered with the conventional copying machine of the above kind.

A feature of the invention is the provision of a copying machine comprising a casing, a carriage movably mounted on said casing and supporting a manuscript to be copied thereon, and a lid pivotably mounted at its one side edge through a pivot shaft on said carriage and covering said manuscript disposed on said carriage, said machine comprising further at least one manuscript holding member resiliently connected to said lid and projecting above said manuscript, a depression formed in the lower surface of said lid so as to enclose said manuscript holding member therein when said lid is covered on said manuscript, and a connection means resiliently connecting said manuscript holding member to said lid so as to urge said manuscript holding member against said manuscript until said lid reaches to its given open position and separate said manuscript holding member from said manuscript when said lid is further opened beyond said given open position of said lid.

The invention will now be described in greater detail with reference to the accompanying drawings, wherein:

IN THE DRAWINGS

DESCRIPTION OF INVENTION

Figure 1:
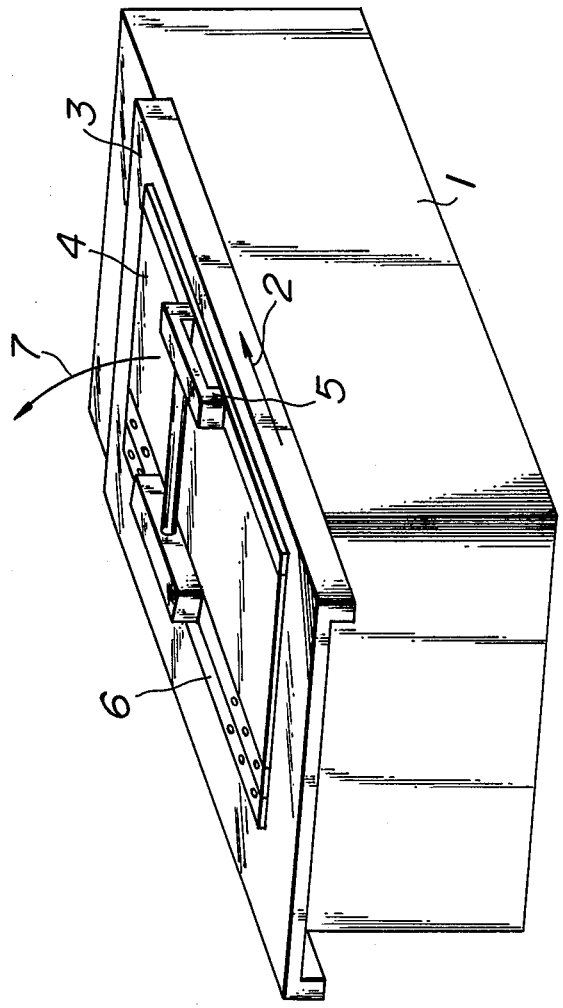
FIG. 1 is a perspective view showing a prior art copying machine.

Referring to FIG. 1, reference numeral 1 designates a casing of a conventional copying machine. On the casing 1 is movably mounted a carriage 3 which is moved in a direction shown by an arrow 2 when a copy of a manuscript is prepared and then returned to its original position. The manuscript is disposed on the carriage 3 and covered and fixed by a lid 4 formed of a rubber sheet etc. when a copy thereof is prepared.

In the case of removing the manuscript from the machine after its copies have been prepared, it is necessary to grasp a handle 5 by one hand and open the lid 4 about its hinge 6 in a direction shown by an arrow 7. When the lid 4 is opened, there is a risk of the manuscript being adhered to the lid 4 particularly if the manuscript is formed of a thin paper and hence being flied off in different directions.

The invention provides a copying machine which can obviated the above mentioned disadvantage of the conventional copying machines.

Figure 2:
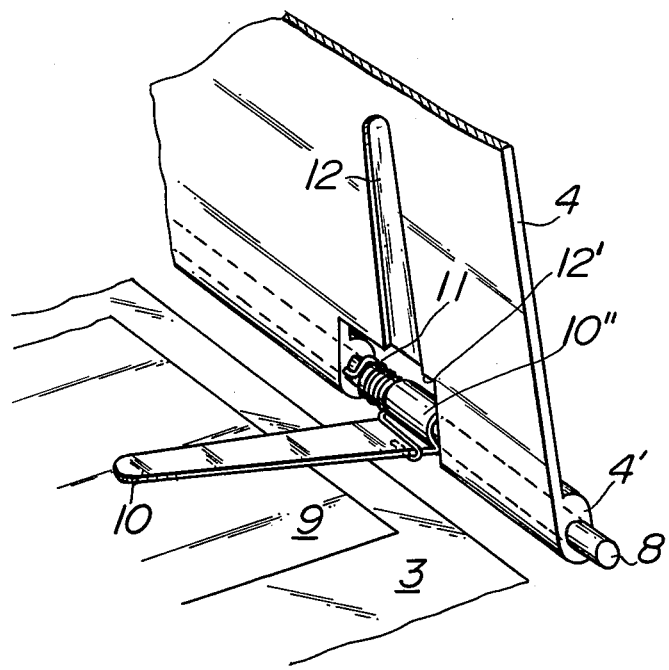
FIG. 2 is a perspective view showing main parts of one embodiment of a copying machine according to the invention in an enlarged scale, the parts being shown at a given open position of a lid.
Figure 3:
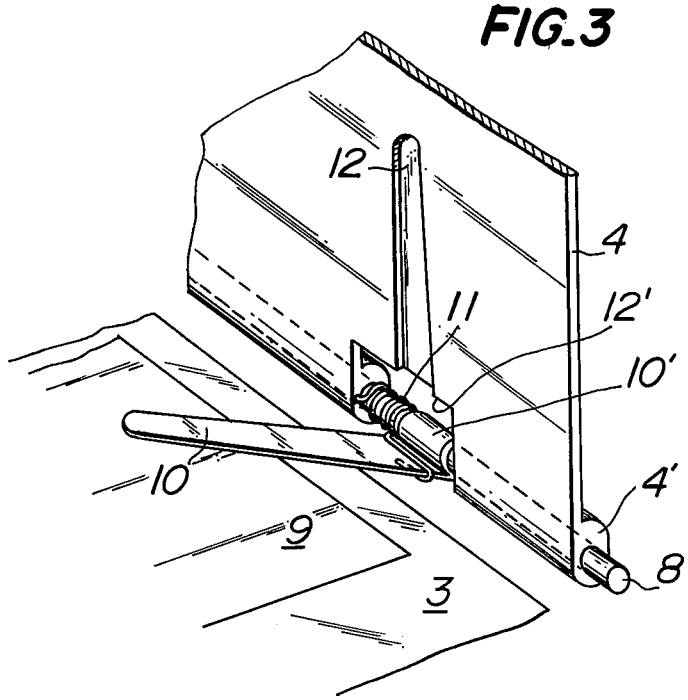
FIG. 3 is a similar perspective view showing the main parts shown in FIG. 2 at a further open position beyond the given open position of the lid shown in FIG. 2.

In FIGS. 2 and 3 is shown one embodiment of the copying machine according to the invention. In the present embodiment, the lid 4 is provided at its knuckle 4' with a pivot shaft 8 made integral with the lid 4 and rotatably mounted on the carriage 3. About the pivot shaft 8 is rotatably mounted a manuscript holding member composed of a sleeve 10' and a flat lever 10 secured to one side edge of the sleeve 10' and extending above the manuscript 9. The sleeve 10' is located in an opening 12' provided in the knuckle 4' of the lid 4. Between the portion of the lid 4 which is faced toward the opening 12' and the sleeve 10' is inserted a torsion spring 11 wound around the pivot shaft 8 and having one end connected to that portion of the lid 4 which is faced toward the opening 12' and another end connected to the flat lever 10 as shown in FIG. 2. The torsion spring 11 is arranged relative to the lid 4 such that the torsion spring 11 causes the flat lever 10 to be pushed against the manuscript 9 until the lid 4 reaches to its given open position shown in FIG. 2 and that if the lid 4 is further opened beyond the given open position of the lid 4 shown in FIG. 2, the lid 4 causes the flat lever 10 to be rotated together with the manuscript lid 4 against the action of the torsion spring 11 and hence separated from the manuscript 9 as shown in FIG. 3. When the lid 4 is fully opened, the flat lever 10 is rotated together with the manuscript lid 4 to a position which does not hinder the handling of the manuscript 9.

The lid 4 is provided at that portion of its lower surface which is opposed to the flat lever 10 with a depression 12 adapted to enclose the flat lever 10 therein when the lid 4 is brought into its closed position shown in FIG. 1.

Figure 4:
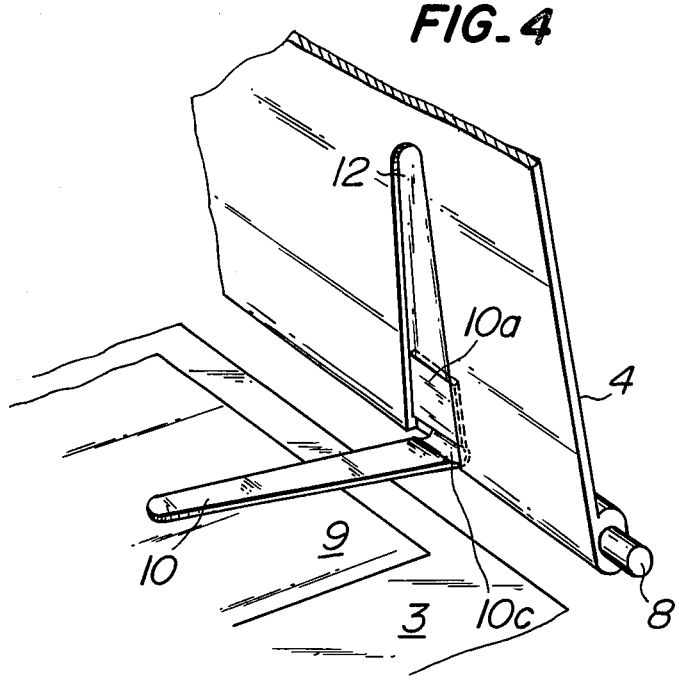
FIG. 4 is a perspective view showing main parts of another embodiment of the copying machine according to the invention in an enlarged scale, the parts being located at a given open position of the lid.
Figure 5:
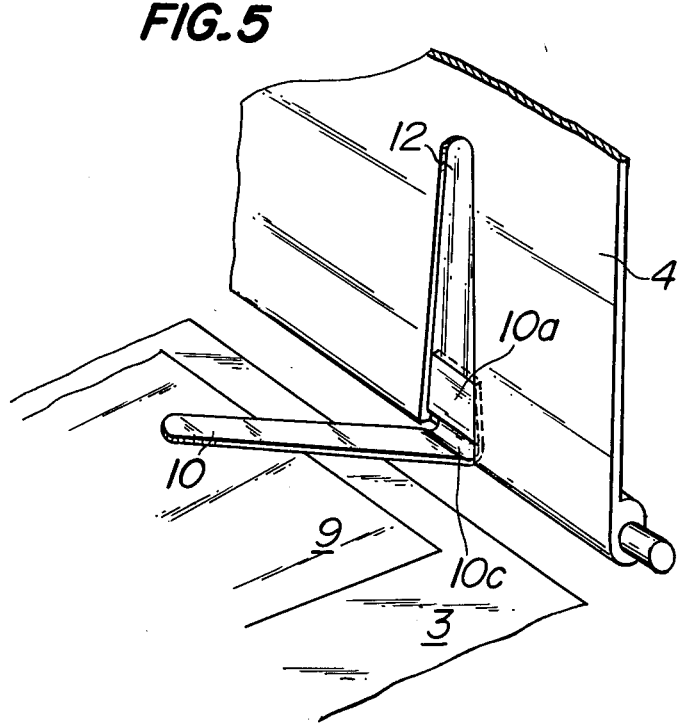
FIG. 5 is a similar perspective view showing the main parts shown in FIG. 4 at a further open position beyond the given open position of the lid shown in FIG. 4.

In FIGS. 4 and 5 is shown another embodiment of the copying machine according to the invention. In the present embodiment, the manuscript holding member is composed of an angle lever consisting of a flat lever 10 and a short base portion 10a. In the present embodiment, the flat lever 10 is formed of a rubber having a high flexural rigidity or polyproplylen. That portion of the depression 12 which is adjacent to the pivot shaft 8 is made deep in depth in which is enclosed the base portion 10a of the flat lever 10. The base portion 10a is secured to the lid 4.

A bent portion 10c between the flat lever 10 and its base portion 10a is made thin in thickness so as to permit the flat lever 10 to rotate about the bent portion 10c.

The flat lever 10 is urged against the manuscript 9 until the lid 4 reaches to its given open position shown in FIG. 4. If the lid 4 is further rotated beyond its given open position shown in FIG. 4 to a position shown in FIG. 5, the flat lever 10 is rotated together with the lid 4 and separated from the manuscript 9. When the lid 4 is fully opened, the flat lever 10 is rotated together with the lid 4 to a position which does not hinder the handling of the manuscript 4. When the lid 4 is brought into its closed position shown in FIG. 1, the flat lever 10 is enclosed in the depression 12. In this case, the base portion 10a of the flat lever 10 is snugly fitted into the deeper portion of the depression 12 and does not prevent the flat lever 10 from being projected out of the depression 10.

As stated hereinbefore, the use of the measures described provides the important advantage that, in the case of removing the manuscript 9 from the machine, even when the lid 4 is opened by grasping the handle 5 (FIG. 1), the flat lever 10 is urged against the manuscript 9 until the lid 4 reaches to its given open position shown in FIGS. 2 and 4 so as to prevent the manuscript 9 from being flied off in different directions, and that if the lid 4 is further opened beyond its given open position to a position shown in FIGS. 3 and 5, the flat lever 10 is separated from the manuscript 9 thus permitting removal and replacement of the manuscript 9 in a conventional manner.

In the conventional copying machine, when the manuscript is set on the carriage 3 by hands, it is necessary to dispose the manuscript by hands at a given position on the carriage 3 and then quickly and slowly cover the lid 4 on the manuscript 9 for the purpose of preventing the manuscript 9 from being displaced from its given position.

On the contrary, in the copying machine according to the invention, when the manuscript 9 is set on the carriage 3 by hands, in the first place the flat lever 10 is urged against the manuscript 9, so that even a thin manuscript can quickly be held by it and then the lid 4 can rapidly be covered on the manuscript 9 without involving any trouble of displacing the manuscript 9 from its given position.

Many modifications and variations of the present invention are possible in light of the above teachings. It is, therefore, to be understood that within the scope of the appended claims, the invention may be practiced otherwise than as particularly described.

What is claimed is:

1. A copying machine employing a casing, a carriage movably mounted on said casing and supporting a manuscript to be copied thereon, a lid pivotally mounted at one side edge through a pivot shaft on said carriage disposed to cover said manuscript on said carriage; said machine comprising: manuscript holding means resiliently connected at one end to a pivotally mounted portion of said lid and having a free end projecting above said manuscript, a lower surface of said lid being formed with a depression for enclosing said manuscript holding means therein when said lid covers said manuscript; a connecting member resiliently connecting the one end of said manuscript holding means to said pivotally mounted portion of said lid, whereby said manuscript holding means being urged against said manuscript until said lid reaches an open position and separates from said manuscript as said lid further opens beyond said given open position.

2. A copying machine as claimed in claim 1, wherein: said manuscript holding means being formed of a sleeve rotatably mounted on said pivot shaft and a flat lever having a base portion secured to said sleeve projecting above said manuscript, and said connecting member being formed of a torsion spring wound about said pivot shaft and connected to both said lid and said flat lever.

3. A copying machine as claimed in claim 1, wherein: said manuscript holding means is formed of an angle lever defined by a flat lever having a free end projecting above said manuscript and a base portion connected through a bent portion to said flat lever; said base portion being secured to a lower depressed part of said depression and said bent portion being thin in thickness for resiliently connecting said flat lever to said base portion.

* * * * *